United States Patent
Pasternak (10) Patent No.: US 9,021,102 B2
(45) Date of Patent: Apr. 28, 2015

(54) PROVIDING PLATFORM-INDEPENDENT COMMUNICATION WITH WEB SERVERS USING COMMAND LINE INTERFACE

(75) Inventor: Michael Pasternak, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 552 days.

(21) Appl. No.: 12/872,682

(22) Filed: Aug. 31, 2010

(65) Prior Publication Data

US 2012/0054351 A1    Mar. 1, 2012

(51) Int. Cl.
  *G06F 15/16* (2006.01)
  *G06F 9/54* (2006.01)
  *H04L 29/08* (2006.01)
  *H04L 29/06* (2006.01)

(52) U.S. Cl.
  CPC ............... *G06F 9/541* (2013.01); *H04L 67/02* (2013.01); *H04L 69/08* (2013.01)

(58) Field of Classification Search
  USPC .......................................... 709/217–229, 246
  See application file for complete search history.

(56) References Cited

U.S. PATENT DOCUMENTS

| 7,111,053 B1* | 9/2006 | Black et al. ................... 709/220 |
| 7,502,999 B1* | 3/2009 | Saiyed .......................... 715/249 |
| 7,581,190 B2* | 8/2009 | Pintos et al. ................... 715/762 |
| 7,668,836 B2* | 2/2010 | Fung et al. .................... 709/219 |
| 7,694,140 B1* | 4/2010 | Sachenko et al. ............. 713/170 |
| 2004/0163090 A1* | 8/2004 | Ledru et al. ................... 719/320 |
| 2007/0055678 A1* | 3/2007 | Fung et al. .................... 707/100 |
| 2008/0016143 A1* | 1/2008 | Bumpus et al. ............... 709/203 |
| 2009/0271472 A1* | 10/2009 | Scheifler et al. .............. 709/202 |

* cited by examiner

*Primary Examiner* — Yasin Barqadle
(74) *Attorney, Agent, or Firm* — Lowenstein Sandler LLP (57) ABSTRACT

A mechanism for platform-independent communication with web servers is disclosed. A method of embodiments of the invention includes accessing a web server of a plurality of web servers from a computer system using a CLI. Accessing the web server is performed independent of a runtime environment at the computer system. The method further includes establishing communication between the web server and the computer system. Establishing communication further includes converting web service arguments into command line arguments that are CLI-compatible and provided through a CLI console associated with the CLI.

20 Claims, 10 Drawing Sheets

```
[WebMethod(MessageName = "Get_SomeEntity")]
[Method(Expose = true)]                                  502
public ReturnValue<SomeEntity> Get_SomeEntity(int id, string name, SomeEntity si)
{
  //use id
  //use name
  return new ReturnValue<SomeEntity>(si, "Test");         504
}
public enum enm{a=1,b=2,c,d,e,f};
public class SomeEntity
{
  public SomeEntity(){;}
  public SomeEntity(int id, string name)
  {
    this.Id = id;
    this.Name - name;
    InternalEntityProperty = new SomeInternalEntityType(id, name, enm.a);
  }
  public SomeEntity(int id, string name, SomeInternalEntityType ie)
  {
    this.Id = id;              512
    this.Name = name;          514
    InternalEntityProperty - ie;    516
  }
  public int Id { get; set; }
  public string Name { get; set; }
  public SomeInternalEntityType InternalEntityProperty { get; set; )
}
pbulic class SomeInternalEntityType
{
  public int Id { get; set; }          522
  public string Name { get; set; }
  public SomeInternalEntityType() { ;}
  public SomeInternalEntityType(int id, string name, enm enm)
  {
    this.Id = (id+1);
    this.Name = name + "_SomeInternalEntityType";
  }
  public enm enm
  {
    get;
    set;
  }
}
```

COMMAND: wsdl2cli -help
RESULT:
Options:
 -h   Display this help

Commands:

Get_SomeEntity        815 (PRIMITIVE TYPE)
810 ─ {int}<-id>      835 (PRIMITIVE TYPE)
830 ─ {string}<-name>      825 (OBJECT)
820 ─ {SomeEnitty}<-si.Id>     815 (PRIMITIVE TYPE)
820 ─ {SomeEntity}<-si.Name>     825 (OBJECT)
840 ─ {SomeInternalEntityType}<-si.InternalEntityProperty.Id>     835 (PRIMITIVE TYPE)
      {SomeInternalEntityType}<-si.InternalEntityProperty.Name>
      {enm}[-si.InternalEntityProperty.enm <a|b|c|d|e|f>]

⎫
⎬ 805
⎭

COMMAND: wsdl2cli Get_SomeEntity -id 1 -name "name1" -si.Id 2 -si.Name "name2" -si.InternalEntityProperty.Id 3 -si.InternalEntityProperty.Name "name3" -si.InternalEntityProperty.enm "a"

RESULT:
(ReturnValueOfSomeEntity) {
  Value =
    (SomeEntity) {
      Id = 2
      Name = "name2"
      InternalEntityProperty =
        (SomeInternalEntityType) {
          Id = 3
          Name = "name3"
          enm = "a"
        }
    }
  Message = "Test"
}

PROVIDING PLATFORM-INDEPENDENT COMMUNICATION WITH WEB SERVERS USING COMMAND LINE INTERFACE

TECHNICAL FIELD

The embodiments of the invention relate generally to web server communication and, more specifically, relate to a mechanism for providing platform-independent communication with web servers using command line interface.

BACKGROUND

Web servers are well-known for performing various functions, including serving web content (e.g., web pages), using Hypertext Transfer Protocol (HTTP), over the World Wide Web (WWW). Web servers are primarily known for delivering web content or used as monitoring devices as part of a monitoring system. A typical web server refers to a computer server that executes web services. However, accessing a web server requires dealing with a number of dependencies which makes web server communication a cumbersome process. The process becomes even more convoluted when multiple web servers are involved. For example, a separate client is required to be generated for each web server that is being accessed and this client-generation depends on the base runtime platform (e.g., Microsoft® .NET®, Java® Runtime Environment, etc.) which further depends on the base operating system (e.g., Microsoft Windows®, Linux®, Unix®, etc.) and so forth.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for platform-independent communication with web servers. A method of embodiments of the invention includes accessing a web server of a plurality of web servers from a computer system using a Command Line Interface (CLI). Accessing the web server is performed independent of a runtime environment employed at the computer system. The method further includes establishing communication between the web server and the computer system, which includes converting web service arguments into command line arguments that are CLI-compatible and provided through a CLI console associated with the CLI.

Embodiments of the invention provide improved two-way communication between web servers and computer systems such that the communication is performed using a CLI and is free of excessive dependencies. In one embodiment, communication between a web server and a computer system is established and maintained independent of runtime environments, operating systems, programming languages, etc., employed at or associated with either the computer system or the web server. For example, regardless of the operating system employed at a computer system, a user (e.g., software developer, programmer, etc.) can use the CLI console at the computer system to access a web server. Moreover, in case of multiple web servers, as soon as the user provides a Uniform Record Locator (URL) identifying a web server, a code corresponding to the web server is dynamically and instantly generated to provide a seamless switching between various web servers and thus, greatly reducing the human factor from the process.

Figure 1:
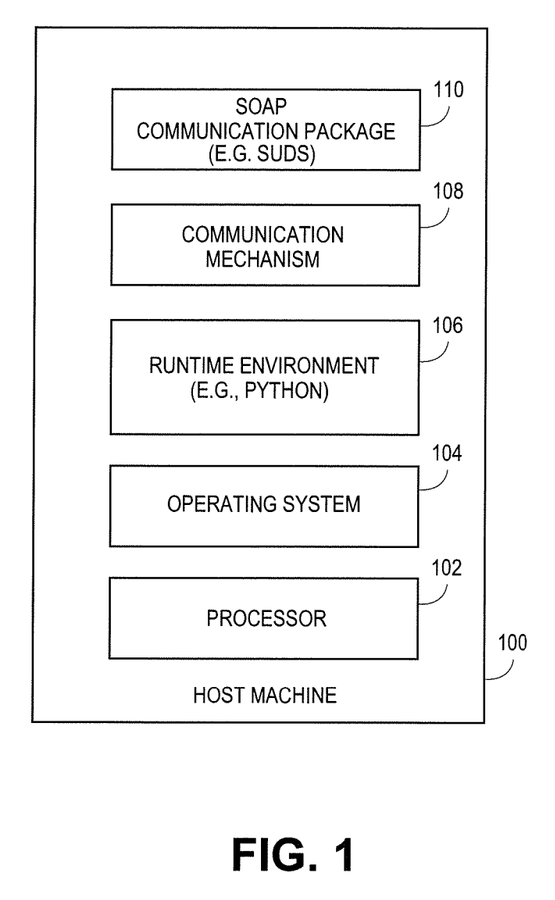
FIG. 1 illustrates a host machine employing a communication mechanism for providing platform-independent communication with web servers according to one embodiment of the invention.

FIG. 1 illustrates a host machine employing a communication mechanism for providing platform-independent communication with web servers according to one embodiment of the invention. In one embodiment, communication mechanism 108 is employed at host machine 100 to facilitate platform-independent communication with web servers such that the communication is performed independent of operating systems, runtime environments, programming languages, and the like. For example, to avoid depending on a particular Graphical User Interface (GUI) and other such dependencies, the communication mechanism 108 provides a CLI shell console to be used by users for accessing web servers using command lines. In one embodiment, this is accomplished using the communication mechanism 108 which translates web server method arguments into CLI arguments and vice versa by dynamically generating a code corresponding to each web server using web services description corresponding to each web server. A web services description can be regarded as a description file that contains essential information (e.g., identifying information, particular attributes, etc.) describing its corresponding web services and/or web servers. In one embodiment, these web services descriptions or files can be automatically and dynamically accessed by the communication mechanism 106 using Web Services Description Language (WSDL) so that a proper two-way communication between a web server and the host machine 100 can be established. WSDL refers to an Extensible Markup Language (XML)-based language that provides a model or acceptable way for describing web services.

Host machine 100 includes a base hardware platform having a processor 102 that is capable, for example, of working with an operating system 104. Operating system 104 serves as an interface between hardware/physical resources of the host machine 100 and the user. In some embodiments, base hardware platform may include memory devices, network devices, drivers, and so on. Host machine 100 includes a server computer system or a client computer system. Terms like "machine", "device" and "computer system" are used interchangeably throughout this document.

In one embodiment, the host machine 100 includes a universal runtime environment 106 that is independent of operating systems 104. For example, Python® runtime environment, which is known as a universal runtime environment and supports any number of operating systems 104 (e.g., Windows, Linux, Unix, Mac®, etc.), may be employed as the runtime environment 106. The two-way communication between the host machine 100 and a web server may be established by the communication mechanism 108 using a Simple Object Access Protocol (SOAP)/SUDS communication package 110 over a network (e.g., Wide Area Network (WAN), Local Area Network (LAN), Internet, etc.). SOAP refers to a protocol used for accessing web servers, exchanging structured information in the implementation of web services, and consuming web services; while, SUDS is a SOAP-based WebService communicating that is particular to Python runtime environment.

Figure 2:
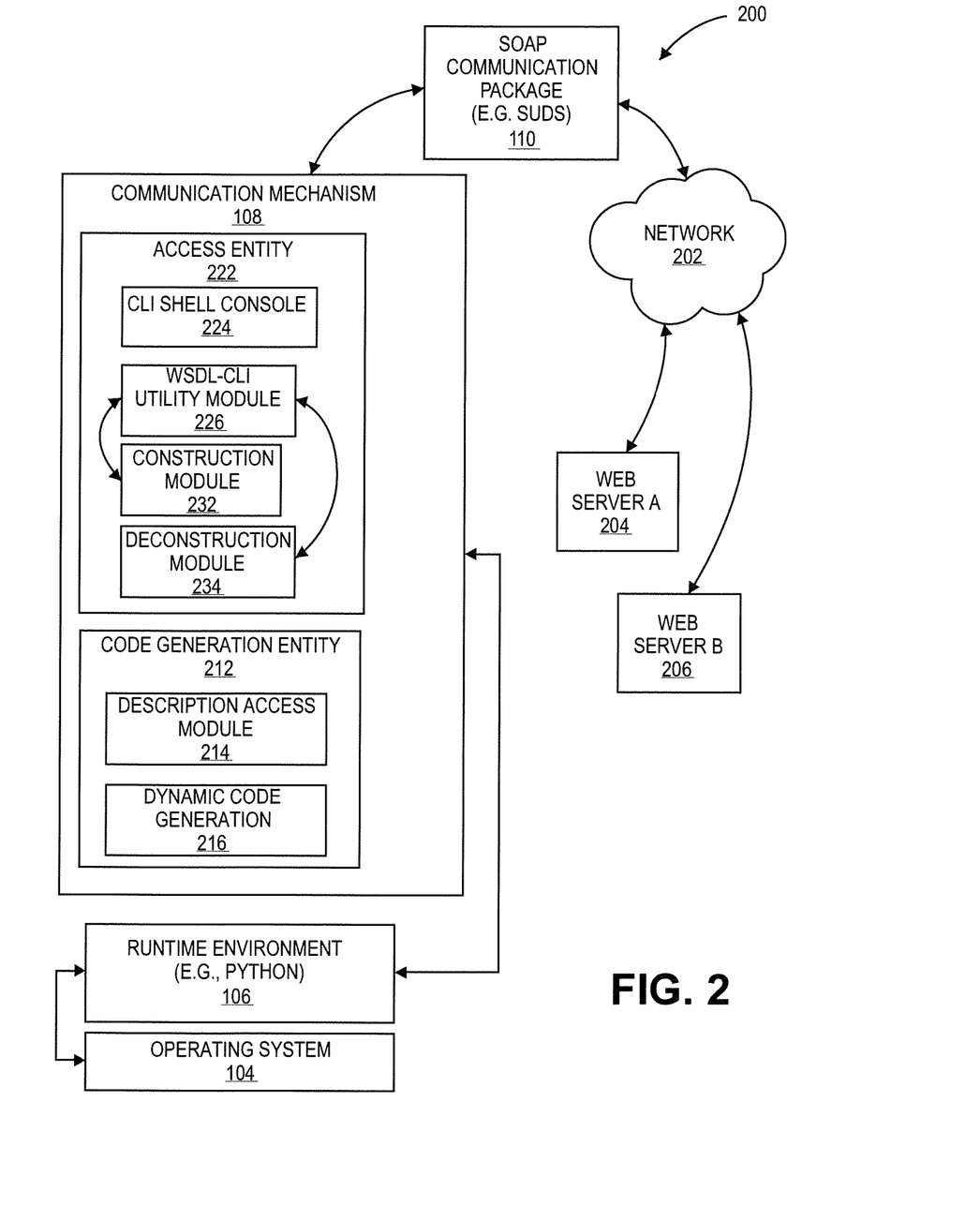
FIG. 2 illustrates a communication system providing platform-independent communication with web servers according to one embodiment of the invention.

FIG. 2 illustrates a communication system providing platform-independent communication with web servers according to one embodiment of the invention. In the illustrated embodiment, communication mechanism 108 is employed to establish platform-independent communication with web servers 204, 206, via SOAP/SUDS communication package 110 over a network 202, in communication with a runtime environment 106 (e.g., Python runtime environment) which is further in communication with an operation system 104 (e.g., Linux).

In one embodiment, the communication mechanism 108 includes a code generation entity 212 and an access entity 222. The code generation entity 212 includes a description access module 214 and a dynamic code generator 216. In one embodiment, when an attempt is made by a user to access web server A 204, such as when a URL corresponding to web server A 204 is provided by the user, the description access module 214 accesses, via WSDL, web services description associated with web server A 204 and extracts relevant information about web server A 204 from its WSDL. In one embodiment, dynamic code generator 216 uses the extracted relevant information from WSDL to generate a code that is particular to web server A 204 so that communication with web server A 204 can be established. This, for example, allows the code generation entity 212 to work with access entity 222 to translate or convert web service method arguments into CLI arguments and vice versa based on providing a platform-independent two-way communication between the web server A 204 and the host machine and other machines. Using the CLI, and thus CLI arguments, etc., the platform-independent communication is provided independent of software frameworks, operation systems, and programming languages, and other software applications, etc., employed at these machines. If, for example, the user switches to access another web server, such as web server B 206, by entering a URL corresponding to web server B 206, the description access module 214 instantly switches to accessing web services description associated with web server B 206 and, as with web server A 204, it dynamically generates a code relevant to web server B 206 to, seamlessly, facilitate communication between the host machine and, now, web server B 206.

In one embodiment, the access entity 222 of the communication mechanism 106 includes a CLI shell console 224 and a WSDL-CLI utility module 226. The CLI console 224 allows a user to access a web server 204, 206 using CLI. WSDL-CLI utility module 226 works with construction module 232 to construct CLI arguments from web service method arguments and further, with deconstruction module 234 to deconstruct CLI arguments back to web service method arguments to facilitate communication between the host machine and web servers 204, 206 using CLI. For example, if web server A 204 is to be accessed, the web service methods relating to web server A 204 are researched for web service method arguments which are further researched for objects and primitive type properties of the web service associated with web server A 204. Since primitive type properties are compatible with CLI, they are stored and provided as they are found. The properties may be stored at a storage device or a database associated with the host machine employing the communication mechanism 108. The objects of the web services methods associated with the web service, on the other hand, are continuously researched until a primitive type property (e.g., integer, string, etc.) is found within the last found object. For example, if object A of a web service method argument is researched and object B is found within object A, then object B is researched and, let us suppose, object C is found within object B. Object C is then researched and, for example, primitive property P is found within object C. In this case, the CLI argument of this corresponding web service method argument is presented in a "period" or "dot" form, such as A.B.C.P. Conversely, a CLI argument is deconstructed, using the deconstruction module 234, to construct or reach a corresponding web service method argument. Using the foregoing example, P is provided as a primitive type property, while the A.B.C portion of the CLI argument is deconstructed into their original forms as objects A, B and C to be provided as a web service method argument. Web service method arguments are part of web services methods and they are used to call web service methods which are part of web services that are executed on web servers 204, 206.

Figure 3:
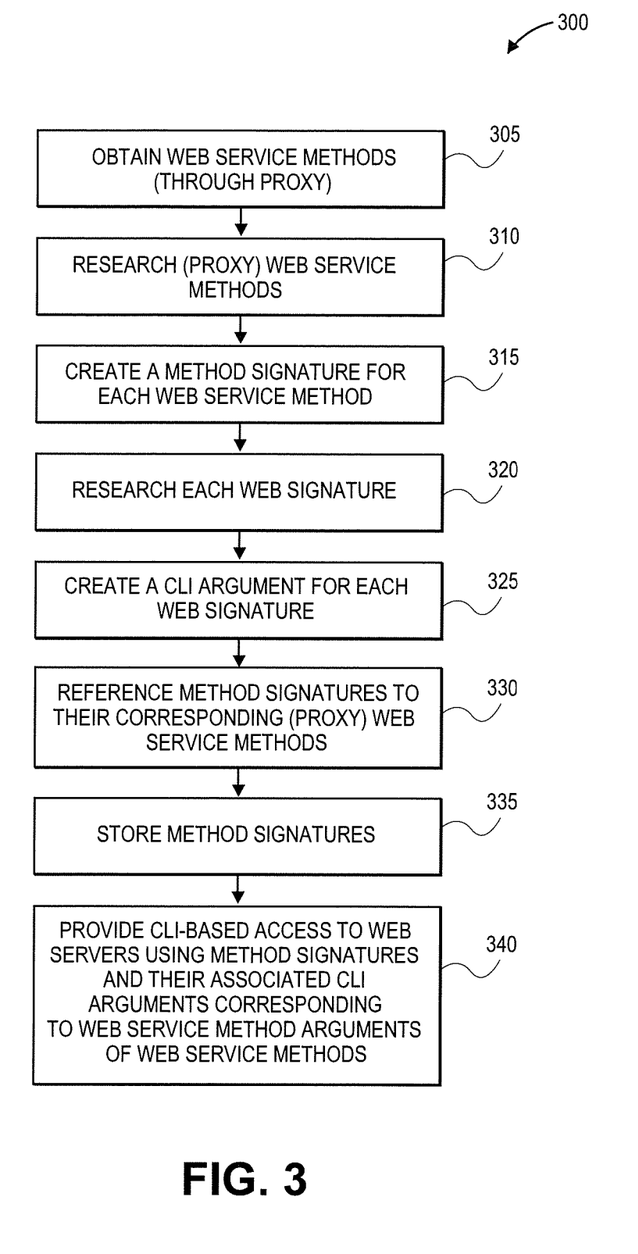
FIG. 3 illustrates a method for constructing command line interface arguments from web service method arguments according to one embodiment of the invention.

FIG. 3 illustrates a method for constructing CLI arguments from web service method arguments according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by communication mechanism of FIG. 1.

In one embodiment, as aforementioned, the SOAP/SUDS communication package is used to establish network contact between host machine and a web server. In one embodiment, SOAP/SUDS communication package includes a protocol that is used to create an instance that provides a web service proxy that may be used as a network interface to access and/or call web service methods of a web server. Typically, the called web service methods are executed locally on a web server by a web service. In one embodiment, a web service proxy is used to access or call web service methods as proxy web service methods, at block 305, while a research proxy of the web service proxy is used to research the proxy web service methods at block 310. Although, in one embodiment, proxies may be generated to call or research web service methods, in another embodiment, such tasks may be performed without the use of proxies. At block 315, WSDL-CLI utility module triggers the construction module of the communication mechanism to generate a method signature for each web service method. Each method signature includes the semantics of a web server method as provided through its corresponding proxy web service method. These method signatures are stored locally in a method signature container.

In one embodiment, at block 320, each method signature is researched for the web service method arguments of its corresponding web service method. Typically, each web service method includes one or both of the following arguments: (1) a primitive type property (e.g., a simple integer or string) that is compatible with CLI; and (2) an object (which may contain one or more additional objects and/or a primitive type property) that is incompatible with CLI. In one embodiment, the web service method semantics at each signature method is researched to determine whether the signature method's corresponding web service method's argument includes a primitive type property or an object. If the argument is a primitive type property, it is stored because it is compatible with CLI. If, however, the argument is an object, further research is done to determine whether the object contains another object or a primitive type property. If the object contains a primitive type property, it is saved. If not, the object is continued to be researched until a primitive type property is found. This is further discussed with reference to FIG. 4.

Once the web service method arguments are researched, a CLI argument representing each web service method argument is created within its corresponding signature method at block 325. For example, for an argument that contains an object (e.g., A) which contains a primitive type property (e.g., P), its dot or period CLI argument representation may look like "A.P". If, however, the first object (i.e., A) contains a second object (e.g., B), the second object is researched. If the second object (i.e., B) contain a primitive type property (e.g., P), its new CLI argument may be represented as "A.B.P".

Each method signature representing a CLI argument is then referenced or mapped to its corresponding proxy web service method (associated with a web service method) at block 330. Each signature method is stored in a method container at block 335. At block 340, CLI-based access to web servers is provided using these stored signature methods representing CLI arguments corresponding to web server method arguments and their associated web server methods.

Figure 4:
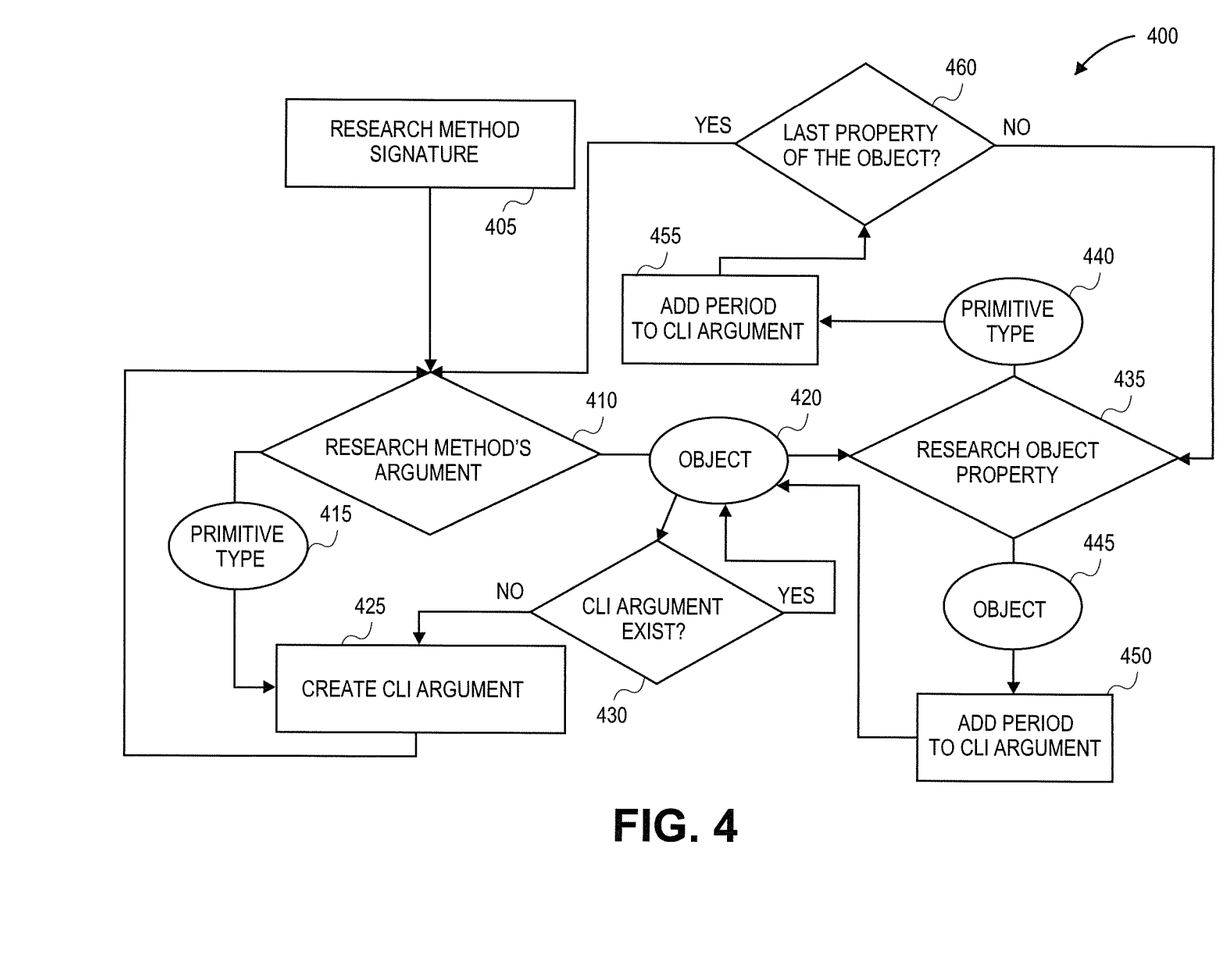
FIG. 4 illustrates a method for converting web service method arguments into command line interface arguments according to one embodiment of the invention.

FIG. 4 illustrates a method for converting web service method arguments into CLI arguments according to one embodiment of the invention. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by communication mechanism of FIG. 1.

In one embodiment, at block 405, each method signature is researched as discussed with reference to FIG. 3. Using the web service method semantics contained in method signatures, each web service method argument (associated with a (proxy) web server method) at a method signature is researched, at block 410, to determine whether the web service method argument contains a primitive type property 415 or an object 420. If the web service method argument includes a primitive type property 415, a CLI argument having the primitive property 415 is created, at block 425, and stored in its corresponding method signature. On the other hand, if the web service method argument is determined to be an object 420, further determination is made as to whether an additional CLI argument exits within the object 420 at block 430. If not, the process leads to the already created CLI argument at block 425. If another CLI argument exits, the object 420 is further researched for a primitive type property 440 or another object 445 at block 435.

If the object 420 includes another object 445, a period- or dot-based CLI argument is formed (by adding a period or dot to separate the two objects 420, 445) at block 450 and the process continues with further researching the object property of the object 420 until a primitive type property 440 is found. For example, if object A (e.g., object 420) includes object B (e.g., object 445) which includes a primitive type property P (e.g., primitive type 440), its period- or dot-based CLI argument is completed and represented as A.B.P at block 455. At block 460, a determination is made as to whether the last primitive type property was the last property of object 420. If not, the process continues with block 435. If yes, the final CLI argument is saved within the corresponding method signature which is stored at a method signature container and the process continues with researching another web service method argument of a method signature at block 410.

Figure 5A:
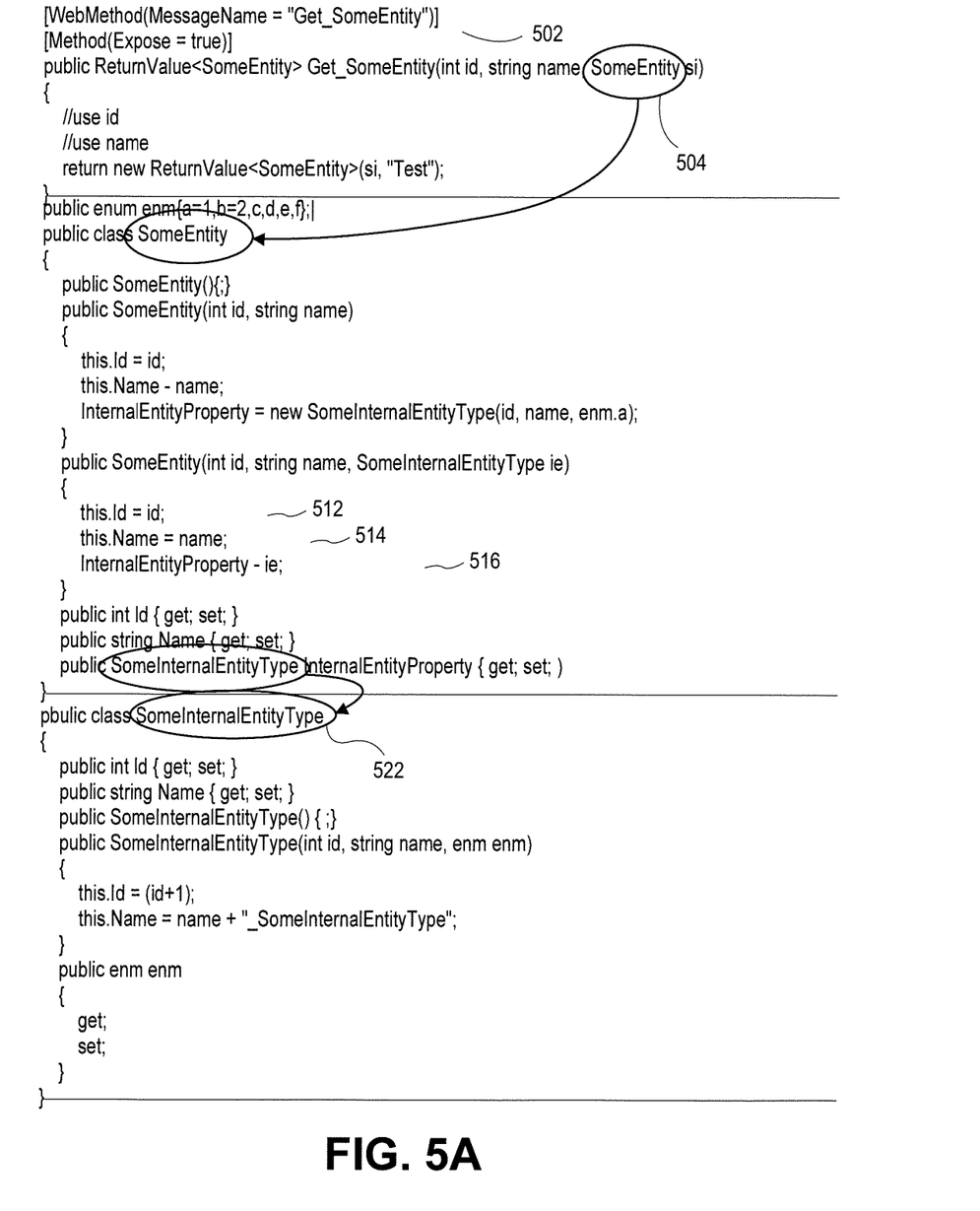
FIGS. 5A and 5B illustrate an example of conversion of web service method arguments to command line interface arguments using the techniques of FIGS. 3 and 4 according to one embodiment of the invention.
Figure 5B:
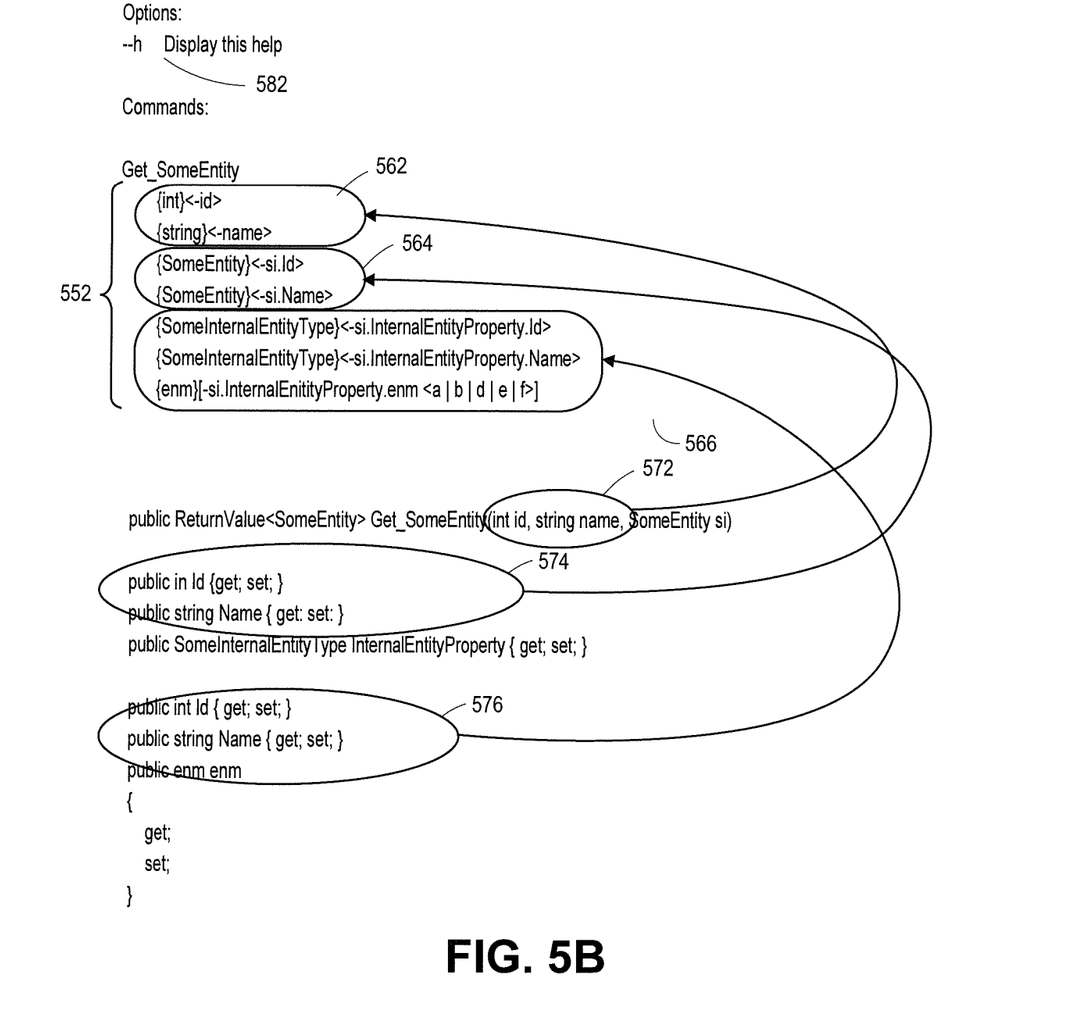

FIGS. 5A and 5B illustrate an example of conversion of web service method arguments to CLI arguments as described with reference to FIGS. 3 and 4 according to one embodiment of the invention. In the illustrated web service code of FIG. 5A, Get_SomeEntity refers to a WebMethod (i.e., web service method) 502, while SomeEntity is a web service method argument 504 of the WebMethod 502. The web service code further provides a number of properties 512, 514, 516 of the web service method argument 504. Of these properties, this.Id=id 512 and this.Name=name 514 are regarded as primitive type properties, while InternalEntityProperty=i.e. 516 is regarded as an object. SomeInternalEntityType is regarded as a WebMethod object argument's nested object 522.

FIG. 5B illustrates the CLI representation 552 of the WebMethod (e.g., Get_SomeEntity (int id, string name, SomeEntity si)) by command lines 552. For example, primitive type properties int id, string name 572 (where id represents the first parameter, and name represents the second parameter) are presented as {int}<-id>{string}<-name> 562 and similarly, properties 574 and 576 are presented as command lines 564 and 566, respectively. The illustrated exemplary command lines 552 are called by a user by entering a help command 582, such as --h, using a CLI console.

Figure 6:
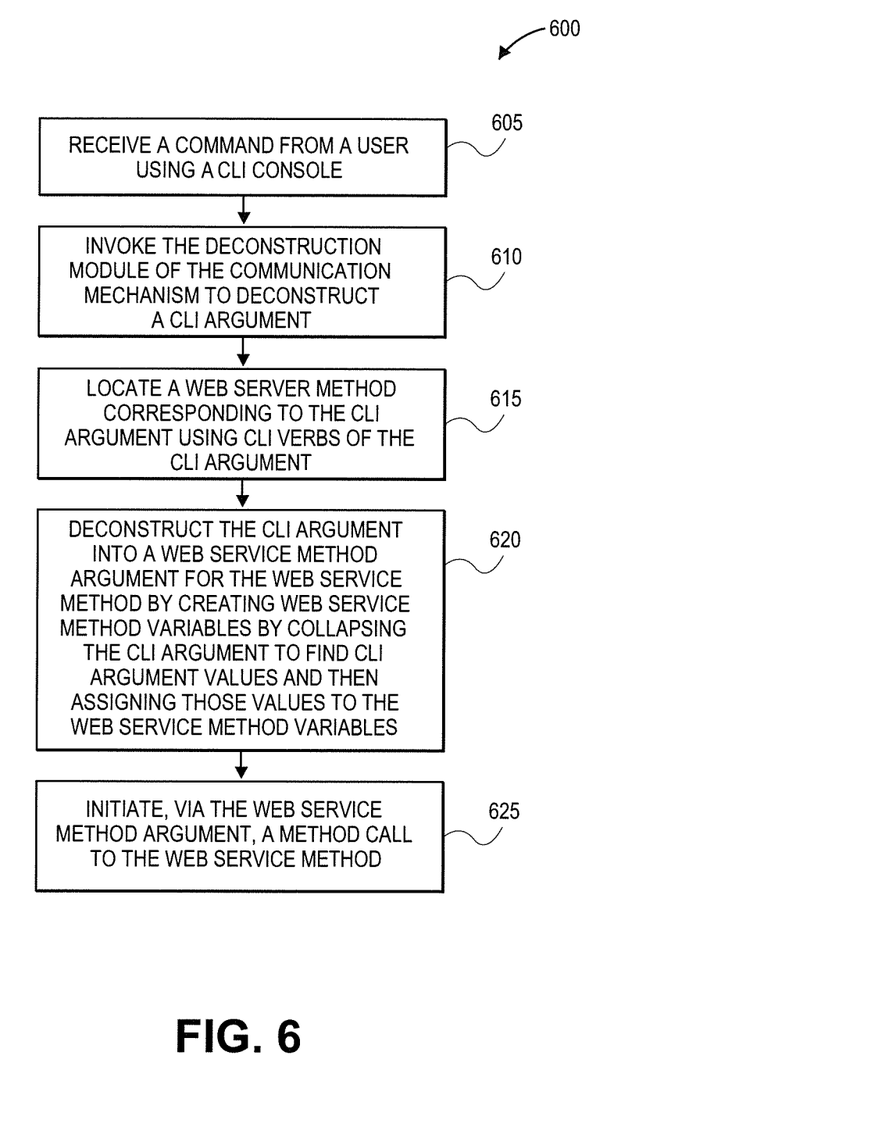
FIG. 6 illustrates a method for deconstructing command line interface arguments into web service method arguments according to one embodiment.

FIG. 6 illustrates a method for deconstructing CLI arguments into web service method arguments according to one embodiment. Method 600 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 600 is performed by communication mechanism of FIG. 1.

In one embodiment, period or dot CLI arguments, like A.B.P, are deconstructed back into being web service method arguments that are used to call their corresponding web service methods of web services being executed at web servers. This is the reverse of constructing CLI arguments from web service method arguments as described in FIGS. 3-5.

In the illustrated embodiment, when a user types in CLI-based commands, they are received by the utility module at block 605. Upon receiving the commands, the deconstruction module of the communication mechanism is invoked, at block 610, to deconstruct CLI arguments associated with the received commands into web service method arguments for web servers to comprehend. This deconstruction process is further described with reference to FIG. 7.

At block 620, in one embodiment, each CLI argument is deconstructed into a web service method argument. The deconstruction may include generating web service method variables associated with a corresponding web service method by collapsing the CLI argument into objects and primitive type properties and then, assigning CLI argument values obtained from these objects and properties and, if any, provided by the user to the web service method variables to generate a corresponding web service method argument. At block 625, the corresponding web service method is called using the web service method argument via SUDS/SOAP. In case of the web server responding back to the user, the web server's response may be displayed back to the user using the CLI console on the host machine.

Figure 7:
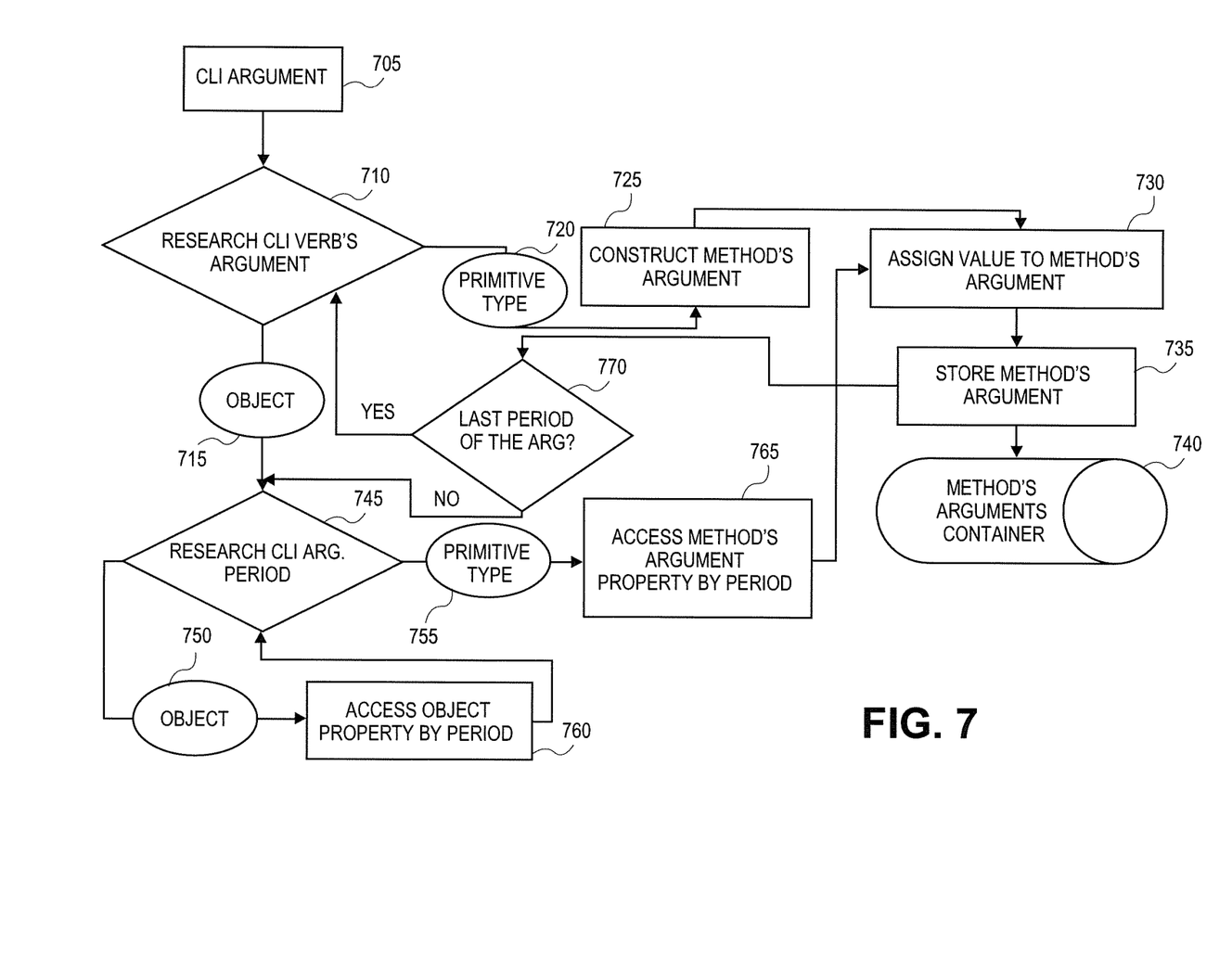
FIG. 7 illustrates a method for deconstructing a command line interface argument into a web service method argument to call a web service method according to one embodiment of the invention.

FIG. 7 illustrates a method for deconstructing a CLI argument into a web service method argument to call a web service method according to one embodiment of the invention. Method 700 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 700 is performed by communication mechanism of FIG. 1.

In one embodiment, a CLI argument 705 is researched at block 710 to determine whether it contains an object 715 and/or a primitive type property 720. If the CLI argument is determined to contain a primitive type property 720, it is used to construct a web service method argument at block 725 and an applicable value of the property 720 and/or as defined by the user is assigned to the web service method argument at block 730. The web service method argument is then stored, at block 735, in a web service method argument container 740.

Referring back to block 710, if the CLI argument includes an object, the object is further researched, at block 745, to determine whether there is another object 750 within the object 715 or a primitive type property 755. This process continues by accessing the objects in the period-based CLI argument by moving from one period to another period at block 760. For example, in case of A.B.C.P (where, A, B and C are all objects, while P is a primitive type property), the process first finds primitive type property P and then moves a period over to discover object C and so forth until it reaches object A. At block 730, any known values are first used to construct the web service method argument, such as placing the value of the primitive type property 755 (such as property P and/or any other values defined by the user) in its proper location within its object, such as object C, and the process continues until the last object, such as object A, is reached. The web service method argument is then saved at block 735 in the web service method argument container 740. The web service method argument is then used to call the corresponding web service method of a web service running at a web server. At block 770, a determination is made as to whether the period is the last period of the argument. If not, the process continues with block 745. If yes, the process goes further back to continue at block 710.

Figure 8:
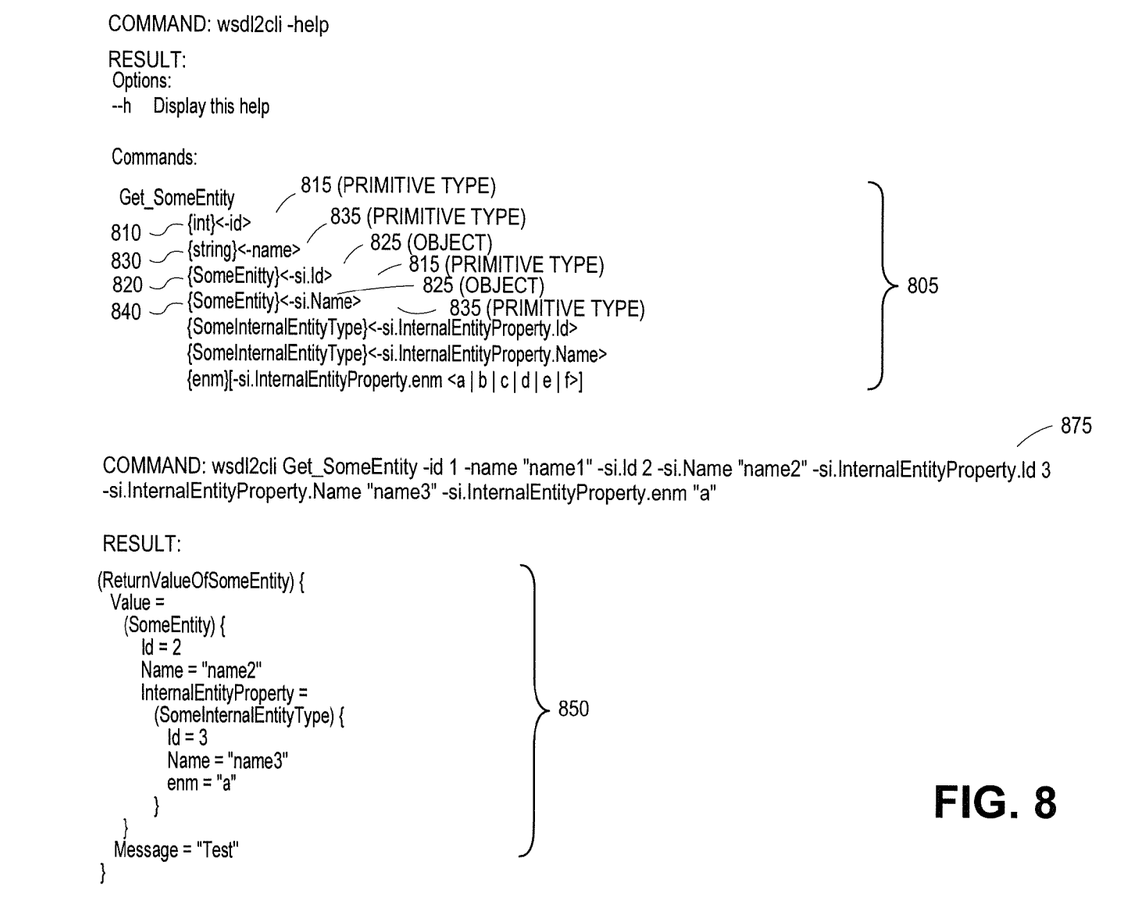
FIG. 8 illustrates illustrate an example of conversion of command line interface arguments into web service method arguments using the techniques of FIGS. 6 and 7 according to one embodiment of the invention.

FIG. 8 illustrates illustrate an example of conversion of CLI arguments into web service method arguments as described with reference to FIGS. 6 and 7 according to one embodiment of the invention. CLI arguments 805 as entered by the user using a CLI console are illustrated. For example, one of the CLI argument 810 represents as having only a primitive type property "id" 815 (such as property P of previous examples), while CLI argument 820 includes object "si" 825 and property "id" 815 within it (such as A.P using previous examples, where A is the object and P is a primitive type property contained within the object). Similarly, primitive property "name" 835 is contained in CLI argument 830 and also shown as being part of object "si" 825 in CLI argument 840. In one embodiment, these CLI arguments 805 are deconstructed into web service method arguments to call an associated web service method of a web service running at a web server. The bottom half show results 850 obtained from a web server in response to the CLI arguments 805 and are shown in a CLI-compatible format using, in one embodiment, the aforementioned web service method argument-CLI argument conversion. Command 875 refers to a command entered by a user using a CLI console.

Figure 9:
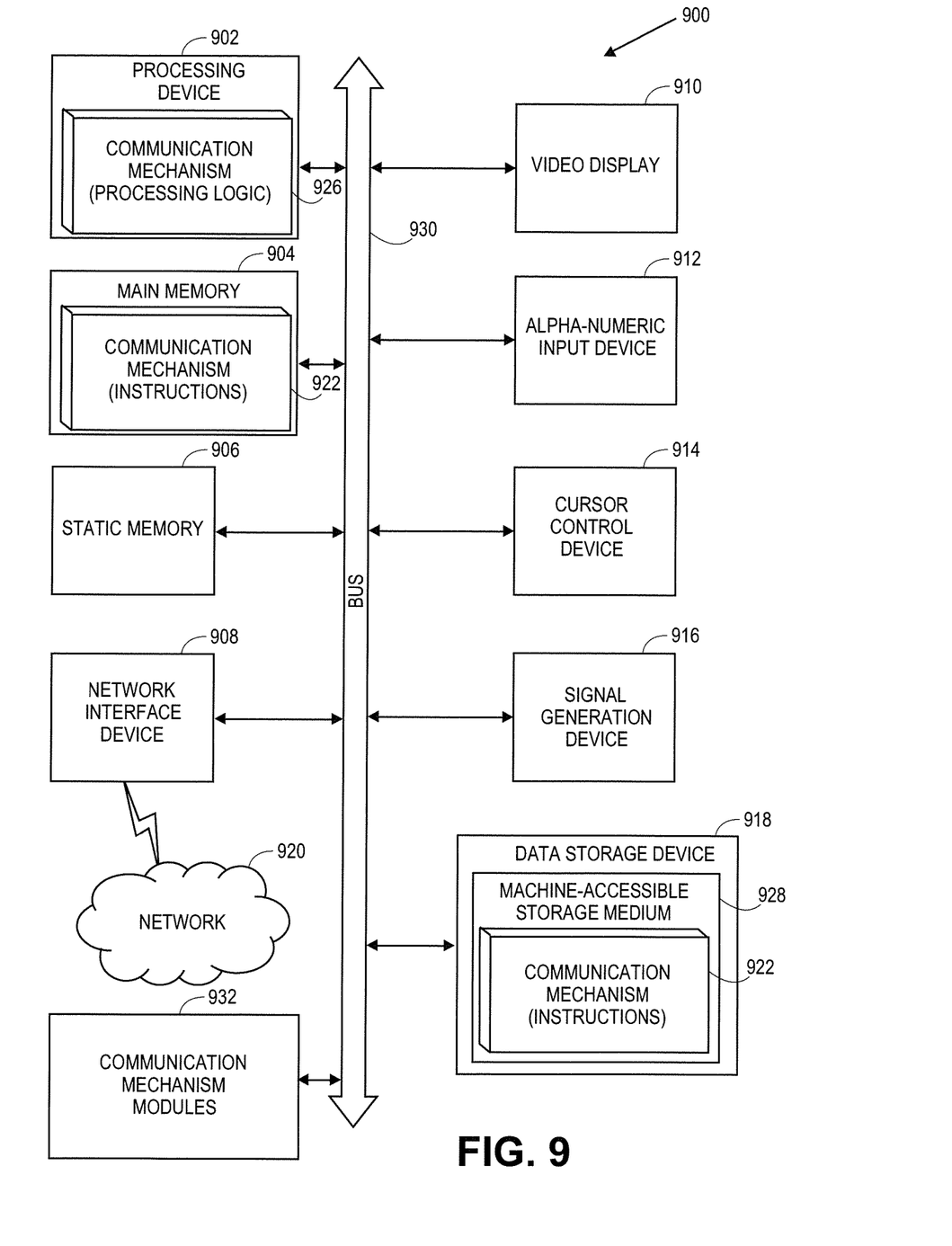
FIG. 9 illustrates one embodiment of a computer system.

FIG. 9 illustrates a computer system 900 for employing communication mechanism according to one embodiment of the invention. Within the computer system 900 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, random access memory (RAM), dynamic RAM (DRAM) such as synchronous DRAM (SDRAM), DRAM (RDRAM), etc.), a static memory 906 (e.g., flash memory, static random access memory (SRAM), etc.), and a secondary memory 918 (e.g., a data storage device in the form of a drive unit, which may include fixed or removable machine-accessible or computer-readable storage medium), which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic 926 for performing the operations and methods discussed herein.

The computer system 900 may further include a network interface device 908. The computer system 900 also may include a video display unit 910 (e.g., a liquid crystal display (LCD) or a cathode ray tube (CRT)) connected to the computer system through a graphics port and graphics chipset, an alphanumeric input device 912 (e.g., a keyboard), a cursor control device 914 (e.g., a mouse), and a signal generation device 916 (e.g., a speaker).

The data storage device 918 may include a machine-accessible storage medium (or a computer-readable storage medium) 928 on which is stored one or more sets of instructions 922 (e.g., communication mechanism) embodying any one or more of the methodologies or functions described herein. The communication mechanism may also reside, completely or at least partially, within the main memory 904 (e.g., communication mechanism (instructions) 922) and/or within the processing device 902 (e.g., communication mechanism (processing logic) 926) during execution thereof by the computer system 900, the main memory 904 and the processing device 902 also constituting machine-readable storage media. Further, for example, the communication mechanism instructions 922 may be transmitted or received over a network 920 via the network interface device 908. As aforementioned with reference to FIG. 1, in one embodiment, communication mechanism may be employed on the same computer system or on different computer systems, such as pointer replacement mechanism resides on one computer system while each of several other computer systems having an implicit pointer dereferencer.

The machine-readable storage medium 928 may also be used to store the communication mechanism (instructions) 922 persistently. While the machine-accessible storage medium 928 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Communication mechanism modules 932, components and other features described herein (for example in relation to FIG. 1) can be implemented as discrete hardware components or integrated in the functionality of hardware components such as ASICS, FPGAs, DSPs or similar devices. In addition, the modules 932 can be implemented as firmware or functional circuitry within hardware devices. Further, the modules 932 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "accessing", "establishing", "communicating", "maintaining", "finding", "locating", "obtaining", "researching", "searching", "storing", "saving", "referencing", "providing", "receiving", "invoking", "constructing", "deconstructing", "initiating", "generating", "translating", "determining", "displaying", "linking", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:

for each of a plurality of web service methods, determining, by a processing device executing a command line interface (CLI) console, whether an argument of the web service method comprises a primitive type property or an object, wherein the plurality of web service methods correspond to a web service executing on a web server separate from a computer system of the processing device;

creating, by the processing device via the CLI console, method signatures for each of the plurality of web service methods, wherein the creating further comprises:

when the argument comprises a primitive type property, storing the argument as a semantic of the method signature; and when the argument comprises an object, parsing the object until a primitive type property is located and storing the located primitive type property and the object as the semantic of the method signature;

generating, by the processing device via the CLI console, command line arguments for each of the method signatures by utilizing the stored semantics of the method signatures, wherein the command line argument are CLI-compatible;

receiving, via the CLI console, at least one of the command line arguments directed to the web server;

converting, by the processing device, the received at least one command line argument into the corresponding argument of the web service in view of the generated method signature for the argument of the web service;

accessing, by the processing device, the web server using the web service argument generated from the converting, wherein the accessing of the web server is performed independent of a runtime environment and operating system of the computer system; and converting the web service arguments received from the web server into the command line arguments for processing by the computer system.

2. The method of claim 1, further comprising generating code for the web service, and facilitating bi-directional communication between the web service and the computing device.

3. The method of claim 1, further comprising generating a first code to establish communication between the computer system and a first web server of a plurality of web servers comprising the web server, wherein the first code corresponds to the first web server.

4. The method of claim 3, wherein the first web server is identified in response to a first uniform record locator ("URL") of the first web server entered by a user to access the first web server.

5. The method of claim 1, further comprising generating a second code to establish communication between the computer system and a second web server of a plurality of web servers comprising the web server, wherein the second code corresponds to the second web server.

6. The method of claim 5, wherein the second web server is identified in response to a second uniform record locator ("URL") of the second web server entered by the user to access the first web server.

7. The method of claim 1, wherein the accessing the web server is performed independent of an operation system or a programming language of the web server.

8. A computing device comprising:

a memory to store instructions to establish platform-independent communication with a web server; and a processing device communicably coupled to the memory, the processing device to execute the instructions that cause the processing device to:

for each of a plurality of web service methods, determine whether an argument of the web service method comprises a primitive type property or an object, wherein the plurality of web service methods correspond to a web service executing on a web server separate from the computing device;

create, via a command line interface (CLI) console, method signatures for each of the plurality of web service methods, wherein the creating further comprises:

when the argument comprises a primitive type property, store the argument as a semantic of the method signature; and when the argument comprises an object, parsing the object until a primitive type property is located and storing the located primitive type property and the object as the semantic of the method signature;

generate, via the CLI console, command line arguments for each of the method signatures by utilizing the stored semantics of the method signatures, wherein the command line argument are CLI-compatible;

receive, via the CLI console, at least one of the command line arguments directed to the web server;

convert the received at least one command line argument into the corresponding argument of the web service in view of the generated method signature for the argument of the web service;

access the web server using the web service argument generated from the converting, wherein the accessing of the web server is performed independent of a runtime environment and operating system of the computing device; and convert the web service arguments received from the web server into the command line arguments for processing by the computer system.

9. The computing device of claim 8, wherein the processing device further to:

generate code for the web service; and facilitate bi-directional communication between the web service and the computing device.

10. The computing device of claim 8, wherein the instructions further cause the processing device to generate a first code to establish communication between the computing device and a first web server of the plurality of web servers comprising the web server, wherein the first code corresponds to the first web server.

11. The computing device of claim 10, wherein the first web server is identified in response to a first uniform record locator ("URL") of the first web server entered by a user to access the first web server.

12. The computing device of claim 8, wherein the instructions further cause the processing device to generate a second code to establish communication between the computing device and a second web server of a plurality of web servers comprising the web server, wherein the second code corresponds to the second web server.

13. The computing device of claim 12, wherein the second web server is identified in response to a second uniform record locator ("URL") of the second web server entered by the user to access the first web server.

14. The computing device of claim 8, wherein the accessing the web server is performed independent of an operation system or a programming language of the web server.

15. A non-transitory machine-readable storage medium including instructions that, when accessed by a processing device, cause the processing device to:
  for each of a plurality of web service methods, determine, by the processing device executing a command line interface (CLI) console, whether an argument of the web service method comprises a primitive type property or an object, wherein the plurality of web service methods correspond to a web service executing on a web server separate from a computer system of the processing device;
  create, by the processing device via the CLI console, method signatures for each of the plurality of web service methods, wherein the processing device to create the method signatures further comprises the processing device to:
    when the argument comprises a primitive type property, store the argument as a semantic of the method signature; and
    when the argument comprises an object, parse the object until a primitive type property is located and storing the located primitive type property and the object as the semantic of the method signature;
  generate, by the processing device via the CLI console, command line arguments for each of the method signatures by utilizing the stored semantics of the method signatures, wherein the command line argument are CLI-compatible;
  receive, via the CLI console, at least one of the command line arguments directed to the web server;
  convert, by the processing device, the received at least one command line argument into the corresponding argument of the web service in view of the generated method signature for the argument of the web service;
  access, by the processing device, the web server using the web service argument generated from the converting, wherein the accessing of the web server is performed independent of a runtime environment and operating system of the computer system; and
  convert the web service arguments received from the web server into the command line arguments for processing by the computer system.

16. The non-transitory machine-readable storage medium of claim 15, wherein the processing device is further to generate code for the web service, and facilitating bi-directional communication between the web service and the computing device.

17. The non-transitory machine-readable storage medium of claim 15, wherein the processing device is further to generate a first code to establish communication between the computer system and a first web server of the plurality of web servers comprising the computer system, wherein the first code corresponds to the first web server.

18. The non-transitory machine-readable storage medium of claim 17, wherein the first web server is identified in response to a first uniform record locator ("URL") of the first web server entered by a user to access the first web server.

19. The non-transitory machine-readable storage medium of claim 15, wherein the processing device is further to generate a second code to establish communication between the computer system and a second web server of the plurality of web servers comprising the web server-system, wherein the second code corresponds to the second web server.

20. The non-transitory machine-readable storage medium of claim 19, wherein the second web server is identified in response to a second uniform record locator ("URL") of the second web server entered by the user to access the first web server.

* * * * *